United States Patent [19]

Nagata et al.

[11] Patent Number: 4,491,978
[45] Date of Patent: Jan. 1, 1985

[54] PORTABLE RADIO RECEIVER WITH HIGH ANTENNA GAIN

[75] Inventors: Koichi Nagata; Daisuke Ishii, both of Tokyo, Japan

[73] Assignee: Nippon Electric Co., Ltd., Tokyo, Japan

[21] Appl. No.: 376,981

[22] Filed: May 10, 1982

[30] Foreign Application Priority Data

May 18, 1981 [JP] Japan ................................ 56-74411

[51] Int. Cl.³ .......................... H04B 1/08; H04B 1/26
[52] U.S. Cl. .................................. 455/338; 455/343; 455/349; 455/351
[58] Field of Search ............... 455/292, 338, 269, 349, 455/351, 343

[56] References Cited

U.S. PATENT DOCUMENTS

| | | | |
|---|---|---|---|
| 2,428,265 | 9/1947 | Crosby | 455/338 |
| 3,889,129 | 6/1975 | Menzel et al. | 455/349 |
| 3,980,952 | 9/1976 | Rapshys | 455/349 |

Primary Examiner—Marc E. Bookbinder
Attorney, Agent, or Firm—Sughrue, Mion, Zinn, Macpeak, and Seas

[57] ABSTRACT

In a portable radio receiver of the type wherein a metal member forming a loop antenna surrounds the circuit components making up the receiver circuitry, the receiver is provided with high impedance elements in series with at least the power supply and grounding lines at some point between the power supply and the RF-IF converter. The antenna circuitry may also include a high impedance element in series with the signal path at some point downstream of the RF-IF converter.

10 Claims, 7 Drawing Figures

PORTABLE RADIO RECEIVER WITH HIGH ANTENNA GAIN

BACKGROUND OF THE INVENTION

The present invention relates to portable radio receivers such as paging receivers, and more particularly to a portable radio receiver having a built-in antenna, whose electrical parts are arranged close to the antenna.

A receiver of this kind has a built-in loop antenna made of a metal plate as disclosed in the U.S. Pat. No. 4,123,756 assigned to the present assignee and issued on Oct. 31, 1978 or in the U.S. Pat. No. 3,956,701 assigned to Bell & Howell Co. and issued on May 11, 1976. The loop antenna generally contains the receiver's constituent parts (for example, electrical parts and printed circuit substrates, including a metal member). In such an arrangement, if a metal member maintained at an equipotential in a high frequency operation to the grounded end of the antenna is disposed close to the ungrounded end of the antenna, the effective aperture area of the loop antenna is reduced to result in a drop in the antenna gain. Though the loop aperture area can be expanded by positioning the loop antenna farther from this metal member to increase the antenna gain, it would result in a larger receiver casing, which would pose a grave problem especially to a miniature radio receiver, such as a paging receiver.

SUMMARY OF THE INVENTION

An object of the present invention is to provide a portable radio receiver with a high antenna gain.

A receiver according to the invention comprises a loop antenna, a higher frequency operative circuit section associated with an antenna circuit, and a lower frequency operative circuit section. The receiver further comprises means exhibiting a high impedance for the higher frequency for connecting these circuit sections, so that the grounding line of the lower frequency operative circuit section has a high impedance to the loop antenna. Therefore, the aperture area of the loop antenna in enlarged in effect and a high-gain loop antenna, susceptible to little loss, is thereby provided.

DESCRIPTION OF THE PRIOR ART

Figure 1:
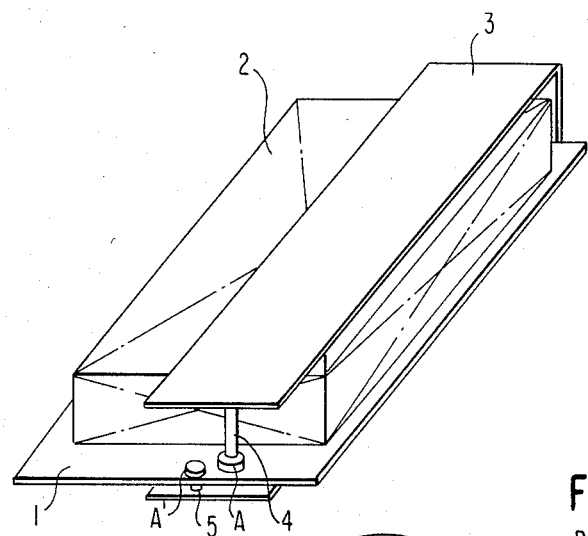
FIG. 1 is a perspective view of an embodiment of a miniature receiver.

Referring to FIG. 1 illustrating an example of a conventional miniature receiver with a built-in loop antenna, circuit components and mechanical parts constituting the receiver are arranged on a printed circuit board 1, and the circuit components are connected to one another by a printed wiring pattern formed on the printed circuit board 1. In the drawing, a circuit component-mounting section 2 on the printed circuit board 1 collectively represents a plurality of components constituting the receiver, which include integrated circuit devices, semiconductor devices (for example, transistors and diodes), transformers, coils, capacitors, switches, battery, etc.

A metallic antenna plate 3 is provided to encompass the printed circuit board 1 and the section 2 and is connected by sockets A and A', fitting with respective antenna lead wires 4 and 5, to the electric circuit on the printed circuit board 1 to constitute a loop antenna. Such constitutent elements are housed in one casing.

Figure 2:
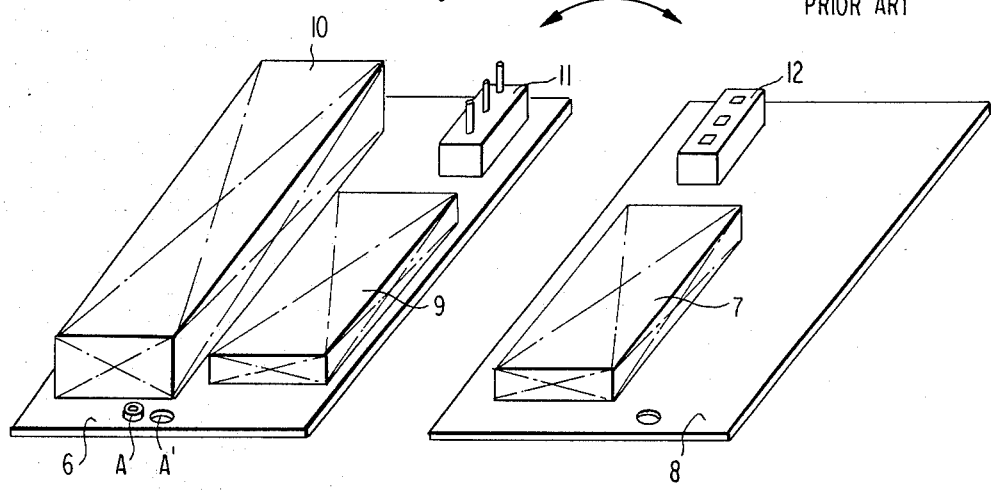
FIG. 2 is an exploded view of a miniature receiver having two part-mounting circuit substrates.
Figure 3:
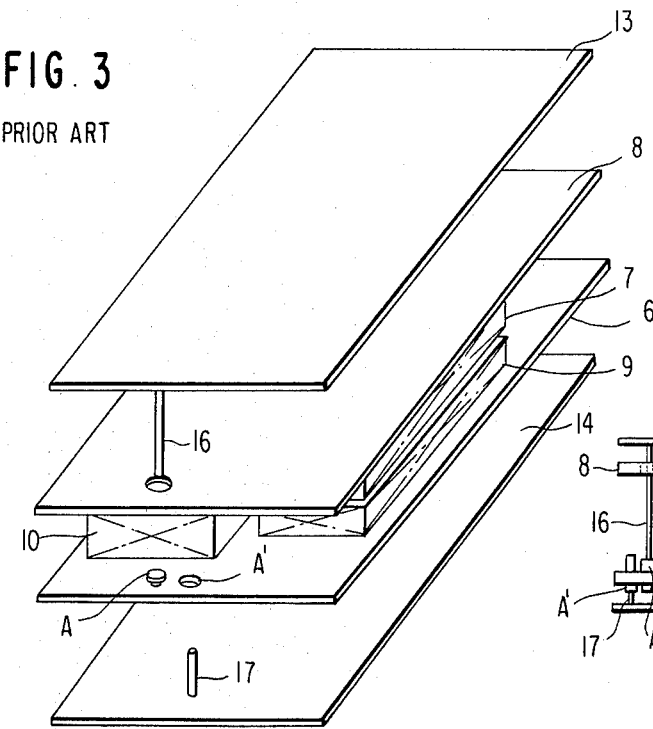
FIG. 3 is a partially exploded view of an example of the connection of two part-mounting substrates of FIG. 2 to a pair of antennas.
Figure 4:
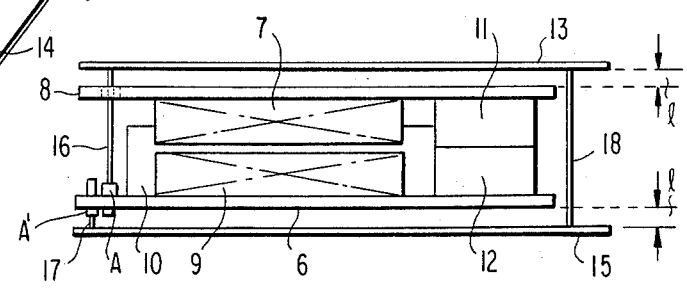
FIG. 4 is a side view of the structure illustrated in FIG. 3.

Another example of a prior art structure is illustrated in FIG. 2, wherein circuit component-mounting sections 9 and 10 and a jack 11 are mounted on a printed circuit board 6, and another circuit component-mounting section 7 and a plug 12 are mounted on another printed circuit board 8. The two boards are assembled to electrically connect the jack 11 and the plug 12 to each other, as illustrated in FIG. 3, wherein like components are denoted by like reference numerals as in FIG. 2. In FIG. 3, antenna plates 13 and 14 are connected to the printed circuit boards 8 and 6 by antenna lead wires 16 and 17, respectively. A side view of the structure illustrated in FIG. 3 is shown in FIG. 4, wherein the lead wires 16 and 17 are seen fully fitting into sockets A and A', with like constituents being denoted by like reference numerals as in FIGS. 2 and 3. Also, the printed circuit boards 6 and 8 are electrically connected through the jack 11 and the plug 12. In addition to the antenna plates 13 and 15, the loop antenna comprises an antenna lead wire 18 and wires 16 and 17 to encompass these printed circuit boards 6 and 8.

The presence of a metal member in a loop antenna results in a decrease in the effective aperture area of the antenna, thereby decreasing the antenna gain. This is because, in a loop antenna smaller than half the wavelength, the aperture area of the loop is proportional to the antenna gain. (See Fujimoto, Ito and Haruki, "A Loop Antenna for Pocket-Size VHF Radio Equipment" (in Japanese) published in National Technical Report edited by Matsushita Electric Industrial Co., Ltd., April 1973, pp. 145–154.) The antenna gain significantly drops especially when the metal member is maintained at a potential equal to the ground potential of the antenna in high frequency operation and is disposed closely to the ungrounded end of the antenna.

To overcome this disadvantage, the antenna plate 3 shown in FIG. 1 is positioned as vertically far as practicable from the section 2. Alternatively, the component mounting is so arranged as not to be contained in the loop antenna 3. These arrangements, however, have the common disadvantage of enlarging the casing of the receiver. Also, in FIGS. 2 to 4, since each circuit board 6 or 8 has a grounding circuit pattern and a power supply circuit pattern, the antenna consisting of the elements 13, 15, 16, 17 and 18 has to be disposed farther from the boards 6 and 8 than the antenna 3 is from the section 2 to achieve the same antenna gain as in the case of FIG. 1, and this again results in the disadvantage of having to enlarge the receiver casing.

DETAILED DESCRIPTION OF THE PREFERRED EMBODIMENTS

Figure 5:
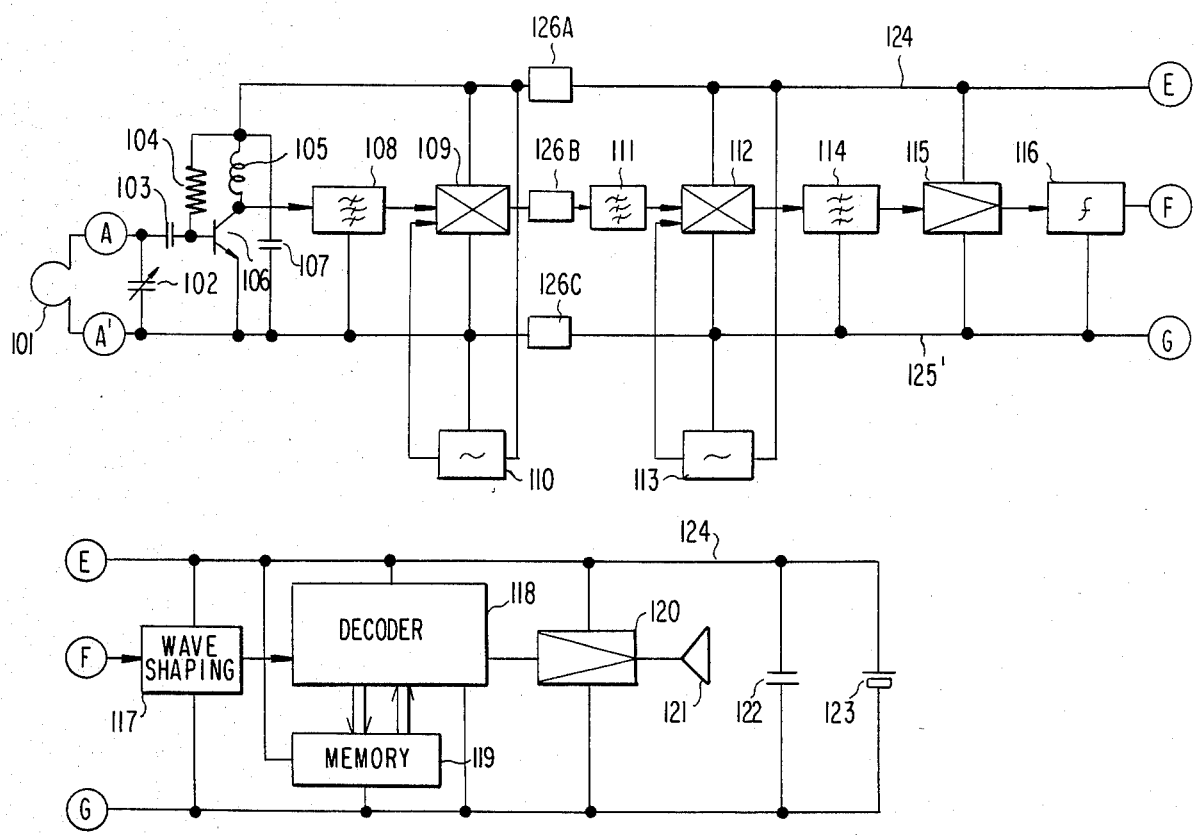
FIG. 5 is a block diagram of a first preferred embodiment of the present invention.

The present invention is intended to eliminate this disadvantage. FIG. 5 is a block diagram of a first preferred embodiment of a 150-MHz band paging receiver according to the invention. The high frequency signal voltage induced on a loop antenna 101 is supplied by way of sockets A and A', respectively fitting with antenna lead wires 4 and 5, to a capacitor 102 connected in parallel to the loop antenna 101. A tuning circuit consisting of the loop antenna 101 and the capacitor 102 is provided for the frequency selection of the high frequency signal voltage, whose output is supplied by way of a matching capacitor 103 to the base of a transistor 106 for high-frequency amplification. A resistor 104 is a bias resistor for giving a D.C. current to the transistor 106, and an inductor 105 is a load on the transistor 106 while a capacitor 107 is a bypass capacitor. The transistor 106, the inductor 105 and the condenser 107 constitute a circuit for handling a signal current. A filter 108 selects the reception frequency of the receiver and feeds it to a mixer 109, which mixes signals from the filter 108 and local oscillation from a local oscillator 110 to frequency-convert received signals and then to feed the converted signals by way of high-impedance circuit 126B and 126C to an intermediate frequency (IF) filter 111. The circuits 126A, 126B and 126C exhibit high impedances to the reception frequency (i.e. the antenna circuit tuning frequency) of this receiver and low impedances to any lower frequency. The IF filter 111 picks out of the frequency-converted signals only the IF signal.

This receiver has its first intermediate frequency at, for instance, 21.4 MHz. This first intermediate frequency is converted by a mixer 112, a local oscillator 113 and an intermediate frequency filter 114 into a second intermediate frequency, which is lower than the first. The second intermediate frequency may be, for instance, 455 kHz.

The output signal of the filter 114 is amplified by an intermediate frequency amplifier 115 and demodulated by a frequency discriminator 116. The demodulated signal is usually a of baseband signal lying in the audio frequency band, including DC. A waveform shaping section 117 comprises filters and removes undesirable frequency components and noise from the output signal of the frequency discriminator 116 and shapes the filtered output into digital signals composed only of "0" and "1". A memory section 119, which stores subscriber-identification numbers assigned to the receiver, is composed of, for instance, read only memories (ROMs) or the like. A decoder section 118 compares the signal from the waveform shaping section 117 with that from the memory section 119 and, if it finds them identical, supplies a coincidence signal to a power amplifier section 120, which amplifies the coincidence signal from the decoder section 118 and causes a speaker 121 to sound an alert tone. Prior art publications regarding the decoder section include U.S. Pat. Nos. 4,194,153; 4,181,893 and 4,249,165. From a battery 123, voltage is supplied to various circuits by way of power supply lines 124 and 124' and grounding lines 125 and 125'. A capacitor 122 is for decoupling the power lines. The receiver illustrated in FIG. 5 is mounted like the circuit component-mounting section 2 on the printed circuit board 1 shown in FIG. 1. Herein, all the circuit components from the sockets A and A' to the high-impedance circuits 126A, 126B and 126C, as referred to in FIG. 5, are arranged close to the antenna lead wires 4 and 5, as referred to in FIG. 1.

Figure 6:
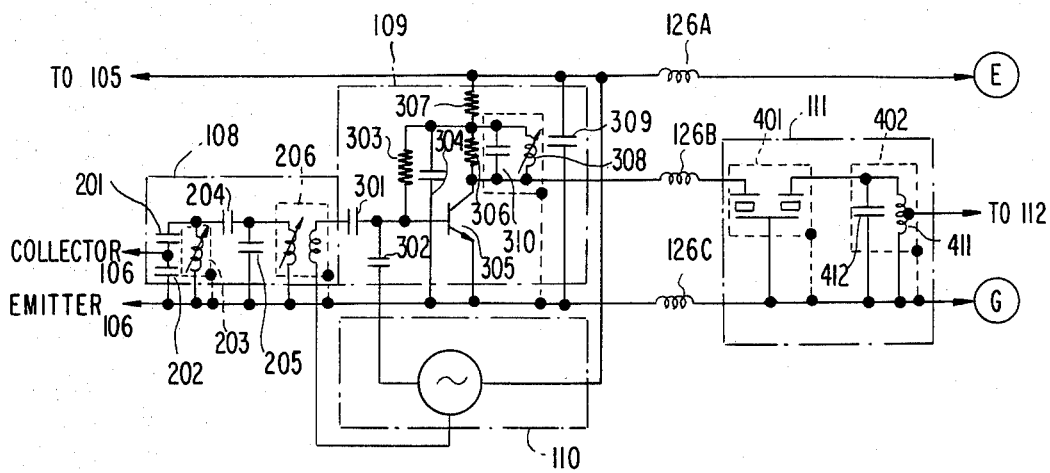
FIG. 6 is a more detailed circuit diagram of a part of the receiver illustrated in FIG. 5.

FIG. 6 is a circuit diagram illustrating in further detail the peripheral connections of the high-impedance circuits 126A, 126B and 126C.

The loop antenna tuning frequency, i.e. the reception frequency, amplified by the high-frequency transistor 106 is supplied to the filter 108. The filter 108 consists of a tuning circuit (further comprising a transformer 203 and capacitors 201 and 202), a second-stage tuning circuit (further comprising a transformer 206 and a capacitor 205), and a coupling capacitor 204 connecting these tuning circuits to each other. The reception frequency having passed this filter 108 is supplied to the base of a transistor 305 for frequency mixing by way of a coupling capacitor 301 in the mixer 109. Meanwhile, the local oscillation from the local oscillator 110 is similarly supplied to the base of the transistor 305 by way of a coupling capacitor 302.

The transistor 305 mixes and amplifies the two frequencies into an intermediate frequency, 21.4 MHz. A coil 308, a capacitor 310 and a resistor 306 constitute a circuit for achieving impedance matching with the IF filter 111 at the next stage, and resistors 303 and 307 make up a D.C. bias circuit to the transistor 305. Capacitors 304 and 309 are provided for decoupling purposes. The high-impedance circuits 126A and 126C provided for increasing the impedance of the power supply circuit at the antenna tuning frequency may consist, in this particular embodiment, of toroidal choke coils having $L = 0.25$ $\mu$H. The high-impedance circuit 126B similarly is intended for increasing the impedance, at the antenna tuning frequency, of the circuit lying between the output terminal of the mixer and the input terminal of the filter 111. If this line involving the output terminal of the mixer and the input terminal of the filter 111 already has a high impedance at the antenna tuning frequency, the high-impedance circuit 126B can obviously be dispensed with. The IF signal supplied to the IF filter 111, after having undergone frequency selection by a crystal filter 401, is supplied by way of an impedance matching circuit 402 (comprising a transformer 411 and a capacitor 412) to the second frequency mixer 112.

To compare the antenna gain of a conventional receiver without the high-impedance circuits 126A, 126B and 126C and that of a receiver according to the present invention, in both of which the space between the circuit component-mounting section 2 and the antenna plate 3 and that between the printed circuit board 1 and the antenna 3 are set at 1 mm each, the gain of the receiver according to this invention is found at least 1.5 dB higher.

Figure 7:
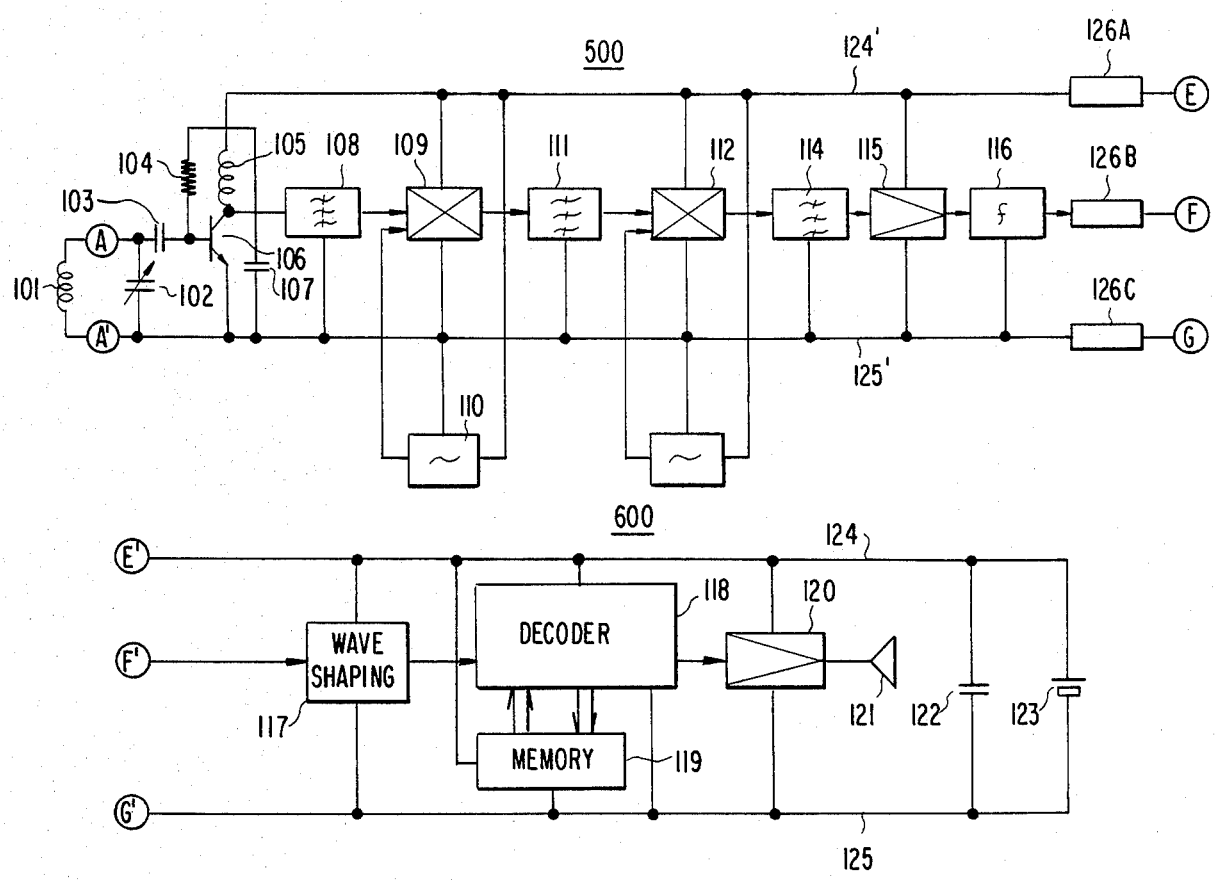
FIG. 7 illustrates a second preferred embodiment the invention.

Next, the structure of a second preferred embodiment of a paging receiver according to the invention is illustrated in FIG. 7. Referring to FIG. 7, the receiver consists of two printed circuit boards: the first board (panel) further consisting of a circuit 500; and the second board (panel) of a circuit 600. The first board assembly has a plug with three terminals E, F and G, and the second board assembly has a mating jack with three terminals E', F' and G'. Circuit components of each assembly are arranged as illustrated in FIGS. 2 to 4. The antenna 101 also is composed as shown in FIGS. 3 and 4.

The circuit 500 has exactly the same structure as illustrated in FIG. 5 except that the high-impedance circuits are inserted at different positions, and the constituent circuits having the same symbols also perform respectively the same functions. In this circuit, the high-impedance circuit 126A is connected in series with the terminal E of the plug, and further to a power line 124 of the circuit 600 via the terminal E' of the jack. The high-impedance circuit 126B supplies the output baseband signal of the frequency discriminator 116 to the waveform shaping circuit 117 by way of the terminal F of the plug and the terminal F' of the jack of the circuit 600. The high-impedance circuit 126C is connected in series with the terminal G of the plug and further to a grounding line 125 of the circuit 500 via the terminal G' of the jack.

The operation of the circuit 600 is exactly identical with that of the corresponding circuit in FIG. 5. Referring to FIG. 7, if the high-impedance circuits 126A, 126B and 126C, as in the case of FIG. 5, consist of toroidal choke coils of $L=0.25$ $\mu H$ and l, as referred to in FIG. 4, equals 1 mm, the antenna gain will be at least 3 dB higher than in a conventional receiver.

If the antenna gain of a conventional receiver, where l=1 mm, is to be raised by 3 dB, l will have to be increased by about 2 mm, which would mean a 4-mm increase in thickness totalling the increments of the upper and lower sections, and a resultant increase in volume by approximately 20 percent over the casing of 18 mm in thickness at l=1 mm.

The high-impedance circuits can obviously be inserted anywhere following their positions shown in the first embodiment.

Referring to FIGS. 1 and 4, if the gap between the antenna plate and the board of the circuit component-mounted face is small, an insulator will of course have to be attached to the antenna plate to prevent the plate from short-circuiting, and in said first and second embodiments of the present invention are used antenna insulators made of 0.3 mm thick polyester film.

As hitherto described, the invention makes it possible to realize a portable radio receiver which is small in casing dimensions and yet has a high-gain built-in loop antenna.

What is claimed is:

1. A portable radio receiver of the type having an antenna built into the receiver, said receiver comprising:
   a high-frequency section having a first power supply line, a first grounding line and an output line, and including an antenna tuning circuit coupled to said antenna, a first circuit connected to said tuning circuit and operating at a tuning frequency of said tuning circuit, and a second circuit connected to the output of said first circuit for converting said tuning frequency into a lower frequency;
   a low-frequency section disposed subsequently to said high-frequency section and operating at said lower frequency, said low-frequency section having a second power supply line, a second grounding line and an input line;
   a power source means having first and second output terminals connected to said second power supply line and second grounding line, respectively; and
   connecting means including first coupling means for coupling said output line with said input line, second coupling means for coupling said first power supply line with said second power supply line and third coupling means for coupling said first grounding line with said second grounding line, each of at least said second and third coupling means having a high impedance at said tuning frequency, thereby increasing the gain of said antenna.

2. A portable radio receiver as claimed in claim 1, wherein said each of at least said second and third coupling means comprises a choke coil.

3. A portable radio receiver as claimed in claim 1 or 2, wherein said antenna is a loop antenna encompassing a printed circuit board mounted with said high-frequency section, said low-frequency section and said connecting means.

4. A portable radio receiver as claimed in claim 3, wherein said loop antenna comprises an antenna plate; and antenna lead wires connected to the ends of said antenna plate, said wires being matable with sockets mounted on said printed circuit board.

5. A portable radio receiver of the type having an antenna built into the receiver, said receiver comprising:
   a first panel means mounted with an antenna tuning circuit coupled to said antenna, a first circuit connected to said tuning circuit and operating at a tuning frequency of said tuning circuit, and a second circuit connected to the output of said first circuit for converting said tuning frequency into a lower frequency, said first panel means having a first power supply line and a first grounding line coupled to power supply and ground terminals of said first and second circuits, and an output line connected to the output of said second circuit;
   a second panel means mounted with a third circuit following said second circuit, said second panel means having a second power supply line and a second grounding line coupled to power supply and ground terminals of said third circuit, and an input line connected to the input of said third circuit;
   power source means having first and second output terminals connected to said second power supply line and said second grounding line, respectively; and
   connecting means including: first coupling means, including mutually connectable first and second connector terminals, for coupling said output line with said input line; second coupling means, including mutually connectable third and fourth connector terminals for coupling said first power supply line with said second power supply line; and third coupling means, including mutually connectable fifth and sixth connector terminals, for coupling said first grounding line with said second grounding line, said first, third and fifth connector terminals being mounted on said first panel means, and said second, fourth and sixth connector terminals being mounted on said second panel means, each of at least said second and third coupling means having a high impedance at said tuning frequency, thereby increasing the gain of said antenna.

6. A portable radio receiver, as claimed in claim 5, wherein said antenna is a loop antenna encompassing said first and second panel means.

7. A portable radio receiver as claimed in claim 6, wherein said loop antenna comprises an antenna plate; and antenna lead wires connected to the ends of said antenna plate, said wires being matable with sockets mounted on at least one of said first and second panel means.

8. A portable radio receiver of the type having an antenna built into the receiver, said receiver comprising:

a first panel means mounted with an antenna tuning circuit coupled to said antenna, a first circuit connected to said tuning circuit and operating at a tuning frequency of said tuning circuit, a second circuit connected to the output of said first circuit for converting said tuning frequency into a lower frequency, and a third circuit disposed subsequently to said second circuit, said first panel means having a first power supply line and a first grounding line coupled to power supply and ground terminals of said first circuit, second circuit and third circuit and an output line connected to the output of said third circuit;

a second panel means mounted with a fourth circuit following said third circuit, said second panel means having a second power supply line and a second grounding line coupled to power supply and ground terminals of said fourth circuit, and an input line connected to the input of said fourth circuit;

power source means having a first and second output terminals connected to said second power supply line and said second grounding line, respectively; and connecting means including: first coupling means, including mutually connectable first and second connector terminals, for coupling said output line with said input line; second coupling means, including mutually connectable third and fourth connector terminals, for coupling said first power supply line with said second power supply line; and third coupling means, including mutually connectable fifth and sixth connector terminals, for coupling said first grounding line with said second grounding line, said first, third and fifth connector terminals being mounted on said first panel means, and said second, fourth and sixth connector terminals being mounted on said second panel means, each of at least said second and third coupling means having a high impedance at said tuning frequency, thereby increasing the gain of said antenna.

9. A portable radio receiver as claimed in claim 8, wherein said antenna is a loop antenna encompassing said first and second panel means.

10. A portable radio receiver as claimed in claim 9, wherein said loop antenna comprises an antenna plate; and antenna lead wires connected to the ends of said antenna plate, said wires being matable with sockets mounted on at least one of said first and second panel means.

* * * * *